Figure 1:
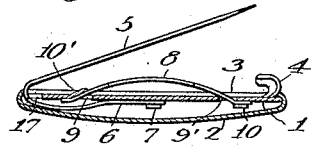

1,221,869. Patented Apr. 10, 1917.
2 SHEETS—SHEET 1.

Fig. 11.

Witnesses:
Patrick J. Conroy
E. B. Tomlinson

Inventor:
Clifford G. King
by Browne & Woodworth
Attys.

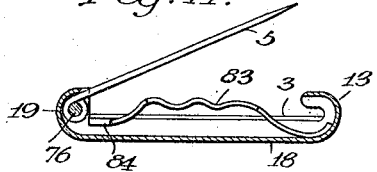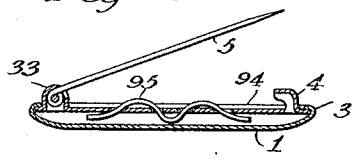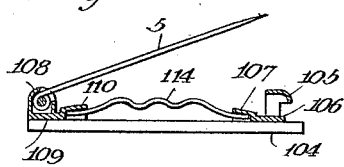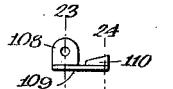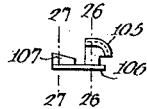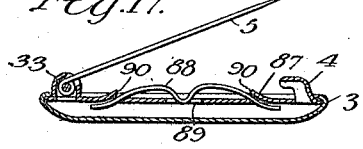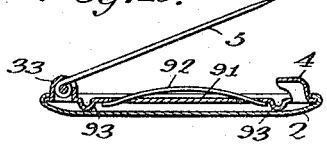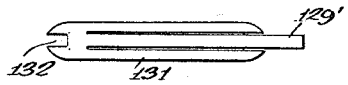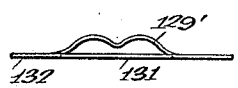

UNITED STATES PATENT OFFICE.

CLIFFORD G. KING, OF PROVIDENCE, RHODE ISLAND.

BROOCH.

1,221,869.

Specification of Letters Patent.

Patented Apr. 10, 1917.

Application filed September 3, 1912. Serial No. 718,188.

*To all whom it may concern:*

Be it known that I, CLIFFORD G. KING, a citizen of the United States, and a resident of Providence, in the county of Providence and State of Rhode Island, have invented a new and useful Improvement in Brooches, of which the following is a specification.

My invention relates to brooches or similar pins and its object is to improve and simplify the construction thereof in the manner hereinafter set forth.

My invention will be described with reference to the accompanying drawings which show several specific embodiments thereof, while its scope will be more particularly pointed out in the appended claims:

In the drawings,—

Figure 8:
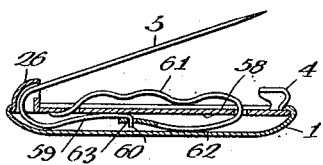
Figure 2:
Figure 9:
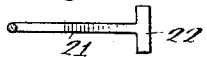
Figure 3:
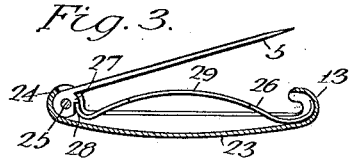
Figure 10:
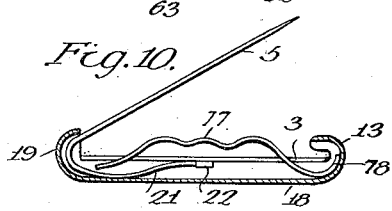
Figure 4:
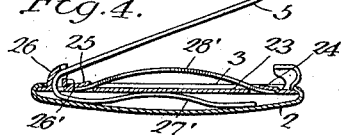
Figure 12:
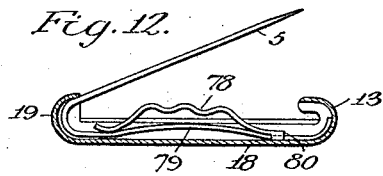
Figure 5:
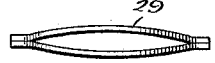
Figure 6:
Figure 13:
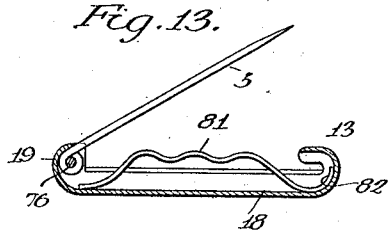
Figure 7:
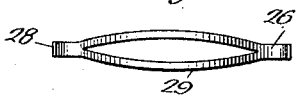

Figure 1 is a longitudinal section of a pin constructed in accordance with my invention. Fig. 2 is a plan view of the bridge shown in Fig. 1. Fig. 3 is a longitudinal section of a modification. Fig. 4 is a longitudinal section of a further modification. Fig. 5 is a plan view of a modified form of bridge that may be used in pins of the type shown in Figs. 1 and 4. Fig. 6 is a plan view of the bridge shown in Fig. 4. Fig. 7 is a plan view of the bridge shown in Fig. 3. Fig. 8 is a longitudinal section of another modification. Fig. 9 is a plan view of the compound bridge shown in Fig. 8. Fig. 10 is a longitudinal section of a further modification. Fig. 11 is a plan view of the lower arm of the pin-tongue shown in Fig. 10. Figs. 12, 13 and 14 are longitudinal sections of still further modifications. Fig. 15 is a plan view of the bridge shown in Fig. 14. Fig. 16 is a plan view of a modified form of bridge that may be used in place of the bridge shown in Fig. 15. Fig. 17 is a longitudinal section of a modification. Fig. 18 is a plan view of the bridge shown in Fig. 17. Figs. 19 and 20 are longitudinal sections of further modifications. Fig. 21 is a longitudinal section of another modification. Fig. 22 is a side view of the hood shown in Fig. 21. Figs. 23 and 24 are transverse sections taken on the lines 23—23 and 24—24, respectively of Fig. 22. Fig. 25 is a side view of the pin-tongue catch or keeper shown in Fig. 21. Figs. 26 and 27 are transverse sections taken on the lines 26—26 and 27—27, respectively, of Fig. 25. Fig. 28 shows a blank for forming a back-plate having a spring bridge integral therewith. Fig. 29 is a side view of said back-plate formed from the blank shown in Fig. 28 and having a spring bridge integral therewith.

In the particular drawings selected for more fully disclosing my invention, the back-plate 1 shown in Fig. 1 is provided with a pin-tongue keeper 4, and is secured to the front-plate 2 in the usual way by rolling the edges 3 of the front-plate over the edges of the back-plate. The pin-tongue is formed of elastic material bent upon itself in the usual way and comprises an upper pointed arm 5 and a lower unpointed arm 6, the end of which may be secured to the under side of the back-plate by means of the lug 7 or other suitable device. The bent portion of the pin-tongue passes through a slot 17 in the end of the back-plate so that when the pointed end of the pin tongue is depressed, the bent portion will have movement with respect to the back-plate through said slot. In the particular instance shown in Fig. 1, I employ a spring bridge 8, bifurcated as shown at 8′ to afford a larger bearing surface for the fabric. The forward end of the bridge is secured to the under side of the back-plate by the lug 10, and the rear end thereof is free to move. The bridge is threaded through the slots 9, 9′, and preferably a portion of the back-plate is bent upwardly as shown at 10′ to afford a bearing for the rearward end of the bridge.

In the pins shown in Figs. 3, 4, 8, 10, 12 and 13, the hood acts as a stop for the pin-tongue when the latter is released from the catch, the elasticity of the spring bridge serving to both press the pin-tongue upwardly to throw it out of locked position when the point is disengaged and also to maintain it against the outer edge of the hood so that when opened, the pin-tongue is always under tension. The user may more readily insert the pin into a fabric by grasping the body portion of the brooch when the pin-tongue is so maintained under tension against the stop, than if it were not held tightly against the same or did not touch it at all.

In Fig. 3, the flattened end of the pin is pivoted at 25 to the trunnions 24, and is provided with a notch 27 which coöperates with the upturned end 28 of the bifurcated bridge 29, the front end of which is held, as shown, in the keeper 13 of the front-plate 23.

In Fig. 4, the back-plate 23 is provided with two sockets 24, 25, at or near its extremities for receiving the ends of the bridge 28'. In this case, the hood 26 which may be formed by drawing up from the back-plate is provided with a lip 26', which is folded over in front of the bent portion of the pin. The bridge in this instance consists of a corrugated wire, as shown in plan view in Fig. 6.

In Fig. 8, the back-plate 58 is provided with two slots near its extremities, and through these slots is inserted the compound curved bridge 61, the lower arm 62 of which is provided with a slot 63 for receiving the downwardly turned projection 60 of the lower arm 59 of the pin-tongue. In this case, the elasticity of both the lower arms 59 and 62 are combined in their effect on the pointed arm of the pin-tongue.

In Fig. 10, the forward end of the spring bridge 77 of the two-piece pin is swaged to the keeper end of the front-plate, and its rearward end is free. The lower arm 21 of the pin-tongue terminates in a T-shaped member, which is held in position by the rolled edges 3 of the front-plate.

In Fig. 12, the spring bridge 78 herein shown as corrugated is provided at its outer end with a socket 80, through which passes the forward portion of the lower arm 79 of the pin-tongue.

In Fig. 13, the spring bridge 81 is swaged at its outer end 82 to the keeper and its other end is free.

In Fig. 14, the hood-end of the spring bridge 83 terminates in a T 84 held in position by the rolled edges 3, while its forward end is free.

If desired, the corrugated wire 85, shown in Fig. 16, may be substituted for the bifurcated bridge shown in Fig. 14. The ends of this corrugated wire are reversely bent, as shown at 86, 86', and the loop 86 is held in position by the rolled edges 3 of the front-plate in the same manner as the T-shaped projection 84.

In Fig. 17, the back-plate 87 is provided with transverse slots 90, 90, for receiving the ends of the spring bridge 88, the middle portion of which is bent to dip into the slot 89 in the back-plate. Preferably, the transverse slots are formed by punching up portions of the back-plate, as shown, so as to afford curved bearings for the ends of the spring bridge.

One form of spring bridge that may be used in connection with Fig. 17 is shown in Fig. 18, and consists of a corrugated wire bent on itself to form the equivalent of the bifurcated bridges shown in Figs. 2 and 5.

In Fig. 19, the back-plate 91 is depressed as shown at 93, 93, for the purpose of forming stops for the ends of the spring bridge 92. When the pin is closed the ends of the spring bridge will make contact with said stops, and the pin will force the fabric against the bowed portion of the bridge, which, by its elasticity, will re-act to hold the same firmly in place.

In Fig. 20, the back-plate 94 is provided with four transverse slots, through which is threaded the compound curved spring bridge 95, the middle bend of which preferably rests upon the front-plate when the pin is open, and thereby enables the elasticity of the other two bends to re-act against the fabric when the pin is closed.

In Figs. 17, 19 and 20, the hoods and keepers may be formed by drawing up the stock of the back-plate.

In Fig. 21, the keeper 105, having a base 106, which terminates in a socket 107, is soldered or otherwise secured to the plate 104 which may be the ornamental plate of a brooch, or else a back-plate adapted to have an ornamental front-plate, such as the front-plate 2, secured thereto. To the other end of the plate 104 is secured by solder or otherwise the hood 108 having a base 109, which is provided with a socket 110. The ends of the spring bridge 114 terminate in the sockets 107, 110.

In Fig. 28, the back-plate 131 is stamped out with a tongue 129', and as shown in Fig. 29, the latter is bent up to form a spring bridge. In this case, any suitable arrangement of pin-tongue may be employed, such, for example, as that shown in Fig. 1, in which case the bent portion will pass upwardly through the slot 132 in the back-plate.

It will be understood, of course, that the usual front-plate may be employed if desired in connection with the device shown in Fig. 29; and it will also be understood that, although in practice the back-plates herein shown and described are intended to be provided with ornamental covers or front-plates, nevertheless, such front-plates may be dispensed with whenever desired.

I do not wish to limit myself to the specific details which I have illustrated herein, since these have been submitted for the purpose of more fully disclosing my invention and may be widely varied and altered within the scope of the appended claims without departing from the spirit of my invention.

I claim:

1. In a pin, a pin-tongue of spring material bent upon itself and comprising an upper and a lower arm, a plate and a spring-bridge associated with said plate, said spring-bridge being independent of said pin-tongue and adapted to coöperate therewith.

2. In a pin, a pin-tongue of spring material bent upon itself and comprising an upper and a lower arm, a back-plate and a spring-bridge associated with said back-plate, said spring-bridge being independent of said pin-tongue and adapted to coöperate therewith.

3. In a pin, a front-plate, a back-plate provided with two slots near its ends, a pin-tongue of spring material bent upon itself and comprising an upper and a lower arm, and a bridge of spring material bent upon itself and comprising an upper and a lower arm, said bridge passing through said slots and the lower arm of said pin-tongue being in engagement with the lower arm of said bridge.

4. In a pin, a pin-tongue of spring material bent upon itself and comprising an upper and a lower arm, a plate and a spring bridge associated with said plate, said spring bridge being independent of said spring tongue, and the ends of said tongue and bridge being in operative engagement.

5. In a pin, a front-plate, a back-plate provided with two slots near its ends, a pin-tongue of spring material bent upon itself and comprising an upper and a lower arm, and a bridge of spring material bent upon itself and comprising an upper and a lower arm, said bridge passing through said slots and the lower arm of said pin tongue having a downwardly-turned projection fitting into a slot in the lower arm of said bridge.

6. In a pin, a pin-tongue, a front-plate, and a spring bridge associated with said front-plate, said spring bridge being independent of said pin-tongue and arranged to coöperate therewith.

In testimony whereof, I have hereunto subscribed my name this 30th day of Aug. 1912.

CLIFFORD G. KING.

Witnesses:
J. E. CLEGG,
L. M. CRESSMAN.